W. G. O'MALLEY.
WATER JACKET.
APPLICATION FILED OCT. 11, 1920.

1,411,178.

Patented Mar. 28, 1922.

Inventor
William G. O'Malley,
by R. C. Long
Attorney

UNITED STATES PATENT OFFICE.

WILLIAM G. O'MALLEY, OF BUFFALO, NEW YORK.

WATER JACKET.

1,411,178.  Specification of Letters Patent.  Patented Mar. 28, 1922.

Application filed October 11, 1920. Serial No. 416,158.

*To all whom it may concern:*

Be it known that I, WILLIAM G. O'MALLEY, a citizen of the United States, residing at Buffalo, in the county of Erie and State of New York, have invented new and useful Improvements in Water Jackets, of which the following is a specification.

This invention is designed for use with water jackets subjected to high heat, such as bosh plates, tuyères, coolers for tuyères, hot blast valves and doors, frames and ports on open hearths and similar articles. With such articles it has been the practice to deliver water through pipe connections and in some instances attempts have been made to extend the pipe connections by screwing an extension into the pipe connections. The difficulty with devices heretofore made has been that the end of the pipe extension has not reached the point of greatest heat and consquently there has been an accumulation or deposit at this point, reducing the cooling effect at that point and consequently reducing the life of the article. The purpose of the present invention is to assure a delivery of the water at the hottest point both to effect a greater cooling at that point and also to assure a circulation at that point so as to prevent a deposit.

The invention is illustrated in the accompanying drawings as follows:—

Figure 1:
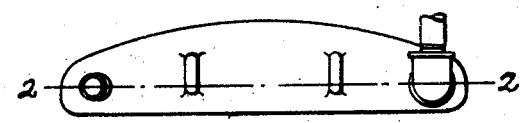

Fig. 1 shows an end elevation of the bosh plate.

Figure 2:
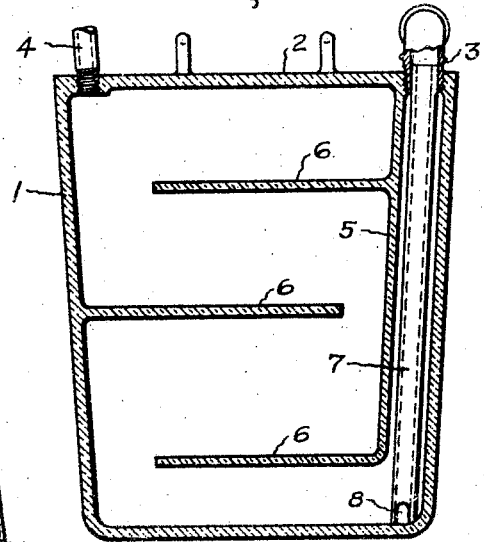

Fig. 2 a section on the line 2—2 in Fig. 1.

Figure 3:
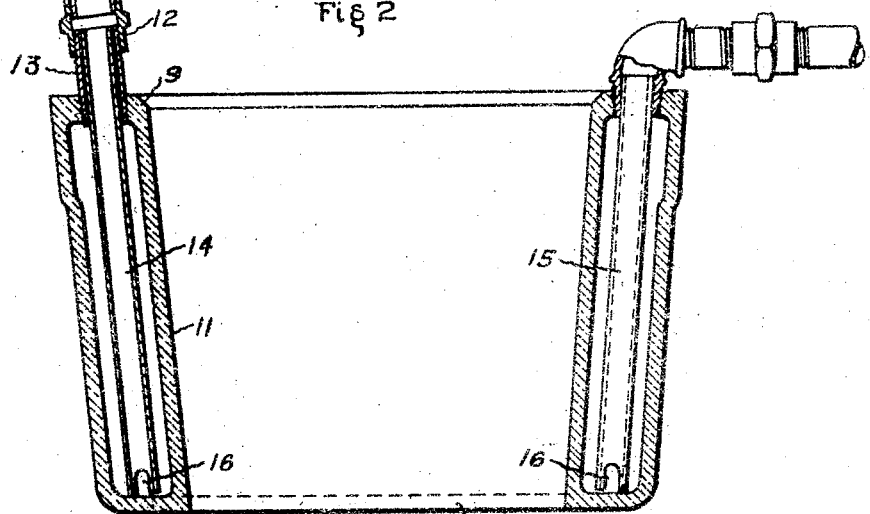

Fig. 3 a central section of a tuyère.

1 marks the bosh plate, 2 the interior of a bosh plate forming the water jacket, 3 a pipe connection leading to the bosh plate, and 4 a discharge pipe from the jacket. The jacket is provided with the usual baffles, such as the inwardly extending portion 5 and baffles 6.

The hottest part of the bosh plate is opposite the pipes 3 and 4 and in carrying out my invention I introduce a pipe 7. This pipe is slidingly mounted in the pipe 3 and consequently it can be slipped forward until the end contacts the inner wall of the bosh, that is to say, the hottest wall.

In order that there may be a free circulation with the end of the pipe in contact with the wall I provide the lateral openings 8 at the end of the pipe so that this adjustment may be effected without preventing a free circulation of water. It will be noted that with this structure the sliding connection assures the locating of the end of the pipe introducing the water at the right location with relation to the wall and simplifies this adjustment as the device is installed. This is of decided advantage because heretofore difficulty has been experienced in so locating the end of the pipe as to assure a delivery of the water at the hottest spot. It will be noted that the inward flow of water of itself will carry the extension to its position.

In Fig. 3 I have shown the device applied to a tuyère. The tuyère walls 9 form the nozzle 10 and this is surrounded by a jacket 11. An inlet pipe 12 is screwed into the rear wall of the tuyère and a discharge pipe 13 is oppositely placed. A slip pipe 14 extends from the pipe 12 through the jacket to the inner wall of the tuyère and has the lateral openings 16. A similar slip pipe 15 extends from the discharge pipe to the inner wall. Consequently a circulation of water is assured directly in contact with the inner wall of the tuyère.

What I claim as new is:—

1. In a water jacket, the combination of the jacket walls; a pipe connection leading to the jacket; and an extension slidingly mounted in the pipe connection and extending to an opposite wall.

2. In a water jacket, the combination of the jacket walls; a pipe connection leading to the jacket; and an extension slidingly mounted in the pipe connection and extending to an opposite wall, said pipe having lateral openings near its inner end.

3. In a water jacket, the combination of the jacket walls; a pipe connection leading to the jacket and directed toward an opposite wall, said opposite wall being the hottest wall of the jacket; and an extension slidingly mounted in the pipe connection and extending to the opposite wall.

In testimony whereof I have hereunto set my hand.

WILLIAM G. O'MALLEY.